United States Patent
Lewis et al.

(10) Patent No.: US 9,928,249 B2
(45) Date of Patent: *Mar. 27, 2018

(54) SCHEDULING DEDUPLICATION IN A STORAGE SYSTEM

(71) Applicant: NetApp, Inc., Sunnyvale, CA (US)

(72) Inventors: Blake Lewis, Los Altos, CA (US); Ling Zheng, Saratoga, CA (US); Craig Johnston, Livermore, CA (US); Vinod Daga, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,789

(22) Filed: Jan. 20, 2017

(65) Prior Publication Data

US 2017/0132243 A1    May 11, 2017

Related U.S. Application Data

(63) Continuation of application No. 14/880,183, filed on Oct. 9, 2015, now Pat. No. 9,569,140, which is a continuation of application No. 13/857,835, filed on Apr. 5, 2013, now Pat. No. 9,286,006.

(51) Int. Cl.
*G06F 17/00* (2006.01)
*G06F 17/30* (2006.01)
*G06F 3/06* (2006.01)

(52) U.S. Cl.
CPC ........ *G06F 17/30156* (2013.01); *G06F 3/067* (2013.01); *G06F 3/0608* (2013.01); *G06F 3/0641* (2013.01)

(58) Field of Classification Search
None
See application file for complete search history.

(56) References Cited

U.S. PATENT DOCUMENTS

| | | | |
|---|---|---|---|
| 8,180,734 B1 * | 5/2012 | Thilmony | G06F 11/1461 707/640 |
| 8,407,191 B1 * | 3/2013 | Nanda | G06F 17/30156 707/654 |
| 8,825,605 B2 | 9/2014 | Nayak | |
| 8,832,034 B1 | 9/2014 | Ramarao | |
| 9,235,588 B1 | 1/2016 | Vaikar et al. | |
| 2004/0044673 A1 * | 3/2004 | Brady | G06Q 10/10 |
| 2008/0005441 A1 * | 1/2008 | Droux | H04L 49/10 710/306 |
| 2009/0204718 A1 * | 8/2009 | Lawton | G06F 9/5016 709/230 |
| 2010/0058013 A1 * | 3/2010 | Gelson | G06F 11/1453 711/162 |
| 2010/0235332 A1 * | 9/2010 | Haustein | G06F 17/30315 707/692 |
| 2010/0332454 A1 * | 12/2010 | Prahlad | G06F 17/30082 707/654 |
| 2011/0029497 A1 * | 2/2011 | Benhase | G06F 3/0608 707/698 |

(Continued)

*Primary Examiner* — Hung Le
(74) *Attorney, Agent, or Firm* — Gilliam IP PLLC

(57) ABSTRACT

A system can maintain multiple queues for deduplication requests of different priorities. The system can also designate priority of storage units. The scheduling priority of a deduplication request is based on the priority of the storage unit indicated in the deduplication request and a trigger for the deduplication request.

20 Claims, 9 Drawing Sheets

(56) References Cited

U.S. PATENT DOCUMENTS

| | | |
|---|---|---|
| 2011/0060759 A1* | 3/2011 | Fienblit ............ G06F 17/30575 707/770 |
| 2011/0307447 A1 | 12/2011 | Sabaa et al. |
| 2012/0089574 A1* | 4/2012 | Doerner ............. G06F 17/3015 707/654 |
| 2012/0158670 A1 | 6/2012 | Sharma et al. |
| 2012/0158672 A1* | 6/2012 | Oltean ............. G06F 17/30091 707/692 |
| 2012/0191669 A1 | 7/2012 | Kennedy et al. |
| 2012/0271993 A1 | 10/2012 | Thompson |
| 2013/0091102 A1 | 4/2013 | Nayak |

\* cited by examiner

SCHEDULING DEDUPLICATION IN A STORAGE SYSTEM

TECHNICAL FIELD

This disclosure relates to storing data, and more particularly, to scheduling data deduplication processes to manage data storage.

BACKGROUND OF THE INVENTION

A storage system is a processing system adapted to store and retrieve information/data on storage devices, such as disks or other forms of primary storage. Typically, the storage system includes a storage operating system that implements a file system to organize information into a hierarchical structure of directories and files. Each file typically comprises a set of data blocks, and each directory may be a specially-formatted file in which information about other files and directories are stored.

The storage operating system generally refers to the computer-executable code operable on a storage system that manages data access and access requests (read or write requests requiring input/output operations) and supports file system semantics in implementations involving storage systems. The Data ONTAP® storage operating system, available from NetApp, Inc. of Sunnyvale, Calif., which implements a Write Anywhere File Layout (WAFL®) file system, is an example of such a storage operating system. The storage operating system can also be implemented as an application program operating over a general-purpose operating system, such as UNIX® or Windows®, or as a general-purpose operating system configured for storage applications.

The storage operating system, will control the process of reading and writing data to a storage device, such as a disk drive, a tape drive, a solid state memory device, a virtual memory device, or some other type of system for storing data. In addition to controlling and supporting data access operations, like data reads and writes, the storage operating system can also organize the data that is stored in memory. This organization process can improve access speed, making it faster to read and write data, and can help reduce the cost of storage, by using the available storage medium more efficiently.

Despite the introduction of less expensive memory devices, such as Serial Advanced Technology Attachment (SATA) disk drives, one of the biggest challenges for storage systems today continues to be the storage cost. There is a desire to reduce storage consumption and therefore storage cost per megabyte by eliminating duplicate data through sharing blocks across files.

One technology to accomplish this goal is a flexible volume that contains shared data blocks. Basically, within one volume, there is the ability to have multiple references to the same data block. Thus, multiple files can share a stored data block that is common to both files, rather than require each file to maintain its own stored copy.

To this end, the storage system may use a deduplication process that performs a duplicate data reduction process by analyzing every block in the volume that has stored data. Each block of data is hashed to generate a digital fingerprint. When deduplication runs for the first time on a flexible volume, it creates a fingerprint database that contains a sorted list of all fingerprints for used blocks in the volume. A separate process compares each fingerprint in the database to all other fingerprints of the flexible volume. If two fingerprints are found to be the same, the system typically performs a byte-for-byte comparison of all bytes in the two blocks and, if there is an exact match between the new block and the existing block on the flexible volume, the duplicate block is discarded and its disk space is reclaimed.

To reclaim the block, the block's pointer is updated to the already existing data block and the new (duplicate) data block is released. Releasing a duplicate data block typically entails updating the logical structure that the storage system uses to track where on the physical volume the data is stored. The deduplication process will increment the block reference count for the maintained location, and free the locations of any duplicate data.

Although these deduplication processes provide powerful tools to improve storage capacity, one of the barriers to adoption of deduplication processes is the amount of user involvement in determining whether a volume will benefit from deduplication and, once a benefit is known, setting up the volume for deduplication. Another barrier is the impact on the system of having deduplication enabled. Deduplication is a heavyweight process. It demands substantial system resources and essentially prevents other processes from running efficiently.

The disclosed system provides ease of management of the deduplication process, and can include the effective use of resources, estimation and policy based management

BRIEF DESCRIPTION OF THE DRAWINGS

Reference is now made to the following descriptions taken in conjunction with the accompanying drawing, in which.

DETAILED DESCRIPTION OF THE INVENTION

Figure 1:
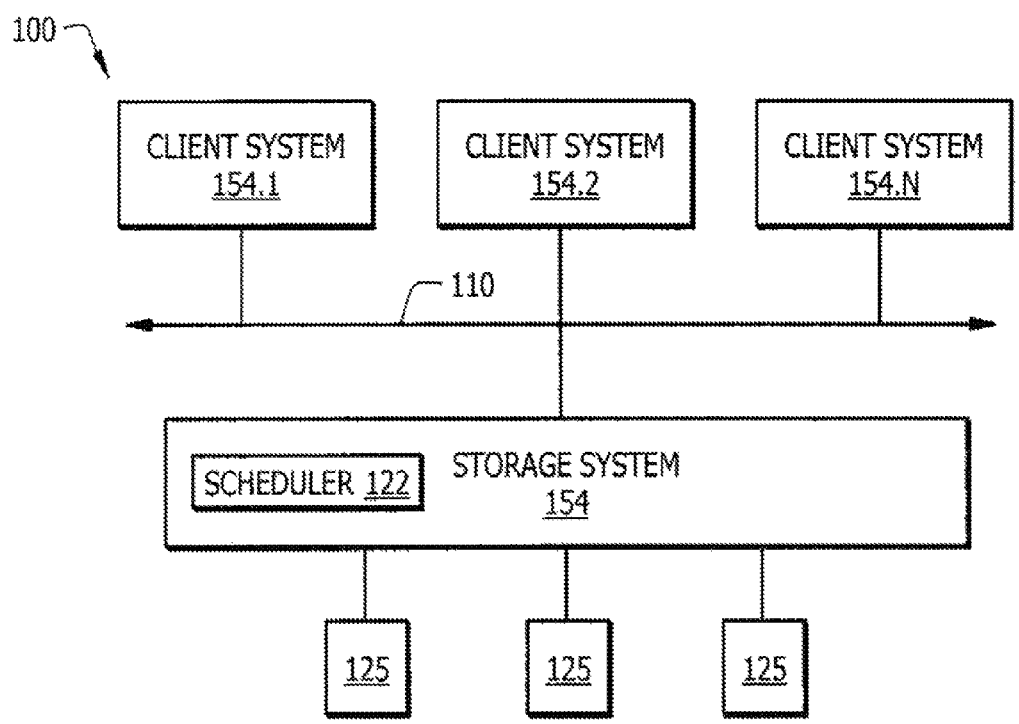
FIG. 1 is a schematic block diagram of an exemplary storage system environment in which embodiments operate.

In embodiments, systems and methods for deduplicating one or more storage units of a storage system provide a scheduler, which is operable to select at least one storage unit (e.g. a storage volume) for deduplication and perform a deduplication process, which removes duplicate data blocks from the selected storage volume. The systems are operable to determine the state of one or more storage units and manage deduplication requests in part based the state information. The system and methods are further operable to manage user generated requests and user-auto requests that may be based in part on user input information. Some examples of user-auto requests being based at least in part on user information include recurring schedule requests, change log fullness requests, and other user generated requests which automatically trigger when an established even occurs. The system may include a rules engine, which prioritizes system operations including determining an order in which to perform state-gathering information and determining an order in which to perform deduplication. The system is further operable to determine the order in which storage units are processed. Upon receiving various requests from various inputs, the rules engine determines whether a session is available to service one or more requests, and if so, passes one or more requests, in prioritized order to an active que, which executes the request using a worker thread.

Other features and modifications can be added and made to the systems and methods described herein without departing from the scope of the invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

In the following description, numerous details are set forth for the purpose of explanation. In embodiments, systems for deduplicating one or more storage units of a storage system provide a scheduler, which is operable to select at least one storage unit (e.g. a storage volume) for deduplication and perform a deduplication process, which removes duplicate data blocks from the selected storage volume. The systems are operable to determine the state of one or more storage units and manage deduplication requests in part based the state information. The system is further operable to manage user generated requests and manage deduplication requests in part based on user input information. The system may include a rules engine which prioritizes system operations including determining an order in which to perform state-gathering information and determining an order in which to perform deduplication. The system is further operable to determine the order in which storage units are processed. Upon receiving various requests from various inputs, the rules engine determines whether a session is available to service one or more requests, and if so, passes one or more requests, in prioritized order to an active queue, which executes each request using a worker thread.

Other applications of the systems and methods described herein will be apparent to those of skill in the art, and any such application or use shall be understood to fall within the scope of the invention. Moreover, one of ordinary skill in the art will realize that the embodiments described herein may be practiced without the use of the specific details set out in the exemplary embodiments and that in other instances, well-known structures and devices are shown in block diagram form to not obscure the description with unnecessary detail FIG. 1 is a schematic block diagram of an exemplary storage system environment 100 in which some embodiments of the systems and method described herein operate. The environment 100 has one or more client system 154 (154.1-154.N) and a storage system 152 (having one or more remote and/or local storage devices 125) that are connected via a connection system 110. The connection system 110 may be a network, such as a Local Area Network (LAN), Wide Area Network (WAN), Metropolitan Area Network (MAN), Storage Area Network (SAN), the Internet, any other type of network or communication system suitable for transferring information between computer systems, or any combination thereof.

A client system 154 may have a computer system that employs services of the storage system 120 to store and manage data in the storage devices 125. Client system 154 may execute one or more applications that submit read/write requests for reading/writing data on the storage devices 125. Interaction between a client system 154 and the storage system 120 can enable the provision of storage services. That is, client system 154 may request the services of the storage system 120 (e.g., through read or write requests), and the storage system 120 may perform the requests and return the results of the services requested by the client system 154, by exchanging packets over the connection system 110. The client system 154 may issue access requests (e.g., read or write requests) by issuing packets using file-based access protocols, such as the Common Internet File System (CIFS) protocol or Network File System (NFS) protocol, over the Transmission Control Protocol/Internet Protocol (TCP/IP) when accessing data in the form of files and directories. Alternatively, the client system 154 may issue access requests by issuing packets, possibly using block-based access protocols, such as the Fibre Channel Protocol (FCP), or Internet Small Computer System Interface (iSCSI) Storage Area Network (SAN) access, when accessing data in the form of blocks.

The storage system 120 may store data in one or more storage devices 125, which may be mass storage devices. A storage device 125 may be any suitable storage device and typically is a writable storage device media, such as disk devices, solid state storage devices (e.g., flash memory), video tape, optical, DVD, magnetic tape, any other similar media adapted to store information (including data and parity information), and/or any combination thereof. The depicted storage devices 125 may represent respective separate storage volumes, and each may be understood as a flexible storage volume capable of being processed to reduce data that is stored duplicatively on multiple locations, typically called storage blocks, across respective volumes. Each storage device 125 can be real or virtual and those of skill in the art will understand that any suitable type of storage device can be employed with the systems and methods described herein, and that the type used will depend, at least in part, on the application being addressed and the practical constraints of the application, such as equipment availability, costs and other factors.

The storage system 120 may implement a file system that logically organizes the data as a hierarchical structure of storage objects such as directories and files on each storage device 125. Each file may be associated with a set of storage (e.g., disk) blocks configured to store data, whereas each directory may be a specially-formatted file in which information about other files and directories are stored. A disk block of a file is typically a fixed-sized amount of data that comprises the smallest amount of storage space that may be accessed (read or written) on a mass storage device 125. The block may vary widely in data size (e.g., 1 byte, 4-kilobytes (KB), 8 KB, etc.). In some embodiments, the file system organizes file data by using data structures, such as but not being limited to, index node data structures (sometimes referred to as buffer trees), to represent the files in the file system. Data may be organized into storage units, which are scalable units of storage which may be physically segmented, virtually segments, or any combination thereof. An example of a storage unit is a storage volume. While the terminology storage volume is used herein for ease of understanding, it is understood that all examples described herein are applicable to any type of storage unit of any size and segmentation.

Figure I further depicts that the storage system 120 includes at least one scheduler 122 of the type described herein that may select one or more storage units, schedule tasks involving the selected one or more storage units, and prioritize the respective tasks based on a number of factors. Some examples of prioritizing a task include, but are not limited to, scheduler 122 determining whether the selection originated from scheduler 122 or some other entity, determining the type of task, determining the class of task, determining whether the task involves a preferred volume, determining the potential savings of a task, and/or any combination thereof. Scheduler 122 may manage operations that determine the state of one or more storage volumes of the system and categorize respective storage volumes according to their determined state. Scheduler 122 may also manage deduplication requests received from scheduler 122 and other sources (for example, from users and other systems in the network).

Schedule 122 may be a non-transient computer program product operable on a computer processor to execute functions describe herein. Additionally and/or alternatively, Scheduler 122 may be a computer processor operable to execute functions described herein. Further, Scheduler 122 may be part of a local computer system and/or part of a network data storage environment. Scheduler 122 may operate on one or more processors in any part of a network data storage environment.

Figure 2:
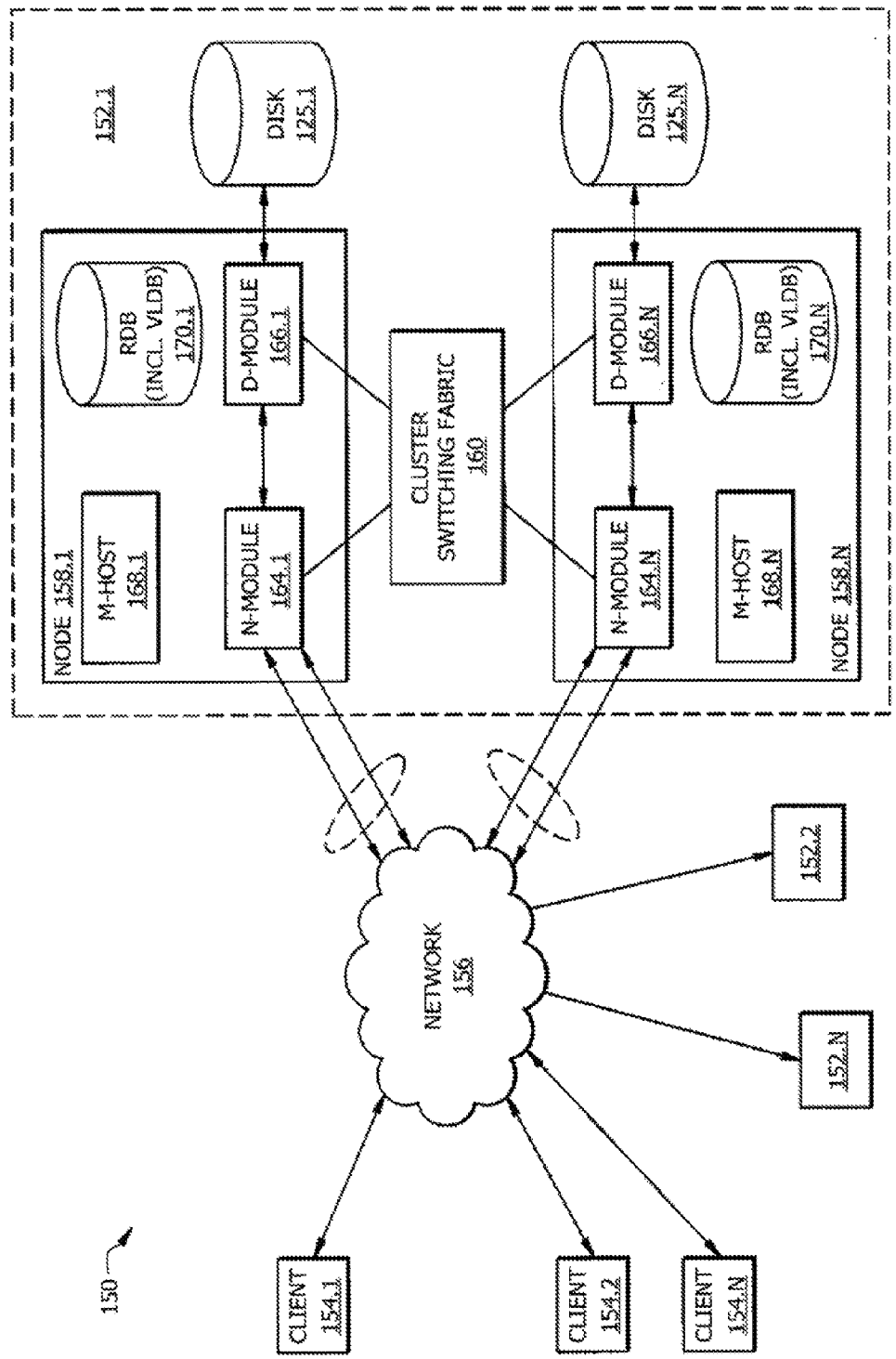
FIG. 2 is a more detailed schematic block diagram of an exemplary storage system embodiment in which embodiments operate.

FIG. 2 depicts a network data storage environment, which can represent a more detailed view of the environment in FIG. 1. The environment 150 may include one or more client systems 154 (154.1-154.N), one or more a clustered storage server system 152 (152.1-152.N), and one or more computer networks 156 connecting client systems 154 and clustered storage server systems 152. As shown in FIG. 2, a clustered environment 150 may include a plurality of server nodes 158 (158.1-158.N), one or more cluster switching fabrics 160, and a plurality of storage devices 125 (125.1-125.N). Cluster storage server systems 152 may comprise one or more scheduler 122. In some embodiments, one or more server nodes 158 may comprise scheduler 122, which may be local to a server node 158 and executable by respective D-modules 166 (166.1-166.N). Alternatively, scheduler 122 may be centralized and operable to execute on a plurality of cluster server nodes 158 (158.1-158.N), and/or a plurality of cluster storage server systems 152 (152.1-(152.N). In the centralized embodiment, scheduler 122 may be executable from within one or more of the server nodes 158 (for example, M-host 168) and/or may be executable on a processor operating outside server nodes 152.

Each of the nodes 158 is configured to include several modules, including an N-module 164, a D-module 166 (also called a D-Blade), and an M-host 168 (each of which may be implemented by using a separate software module and/or separate computer processors) and an instance of, for example, a replicated database (RDB) 170. Specifically, node 158.1 includes an N-module 164.1, a D-module 166.1, and an M-host 168.1; node 158.N includes an N-module 164.N, a D-module 166.N, and an M-host 168.N; and so forth. The N-modules 164.1-164.N include functionality that enables nodes 158.1-158.N, respectively, to connect to one or more of the client systems 154 over the network 156, while the D-modules 166.1-166.N provide access to the data stored on the disks 125.1-125.N, respectively. The M-hosts 168 provide management functions for the clustered storage server system 152. Accordingly, each of the server nodes 158 in the clustered storage server arrangement provides the functionality of a storage server. Scheduler 122 may be operable to be executed on any one of the N-modules, M-Modules, D-modules, and/or any combination thereof.

FIG. 2 illustrates that the RDB 170 is a database that may be replicated throughout the cluster, e.g., each node 158 may include an instance of the RDB 170. The various instances of the RDB 170 may be updated regularly to bring them into synchronization with each other. The RDB 170 provides cluster-wide storage of various information used by all of the nodes 158, including a volume location database (VLDB) (not shown). The VLDB is a database that indicates the location within a cluster of each volume in the cluster (e.g., the owning D-module 166 for each volume) and is used by the N-modules 164 to identify the appropriate D-module 166 for any given volume to which access is requested.

The nodes 158 are interconnected by a cluster switching fabric 160, which can be embodied as a Gigabit Ethernet switch, for example. The N-modules 164 and D-modules 166 cooperate to provide a highly-scalable, distributed storage system architecture of a clustered computing environment implementing exemplary embodiments of the present invention. Note that while there is shown an equal number of N-modules and D-modules in FIG. 1 B, there may be differing numbers of N-modules and/or D-modules in accordance with various embodiments of the technique described here. For example, there need not be a one-to-one correspondence between the N-modules and D-modules. As such, the description of a node 158 comprising one N-module and one D-module should be understood to be illustrative only. Further, it will be understood that the client systems 154 (154.1-154.N) can also act as nodes and include data memory for storing some or all of the data set being maintained by the storage system.

Figure 3:
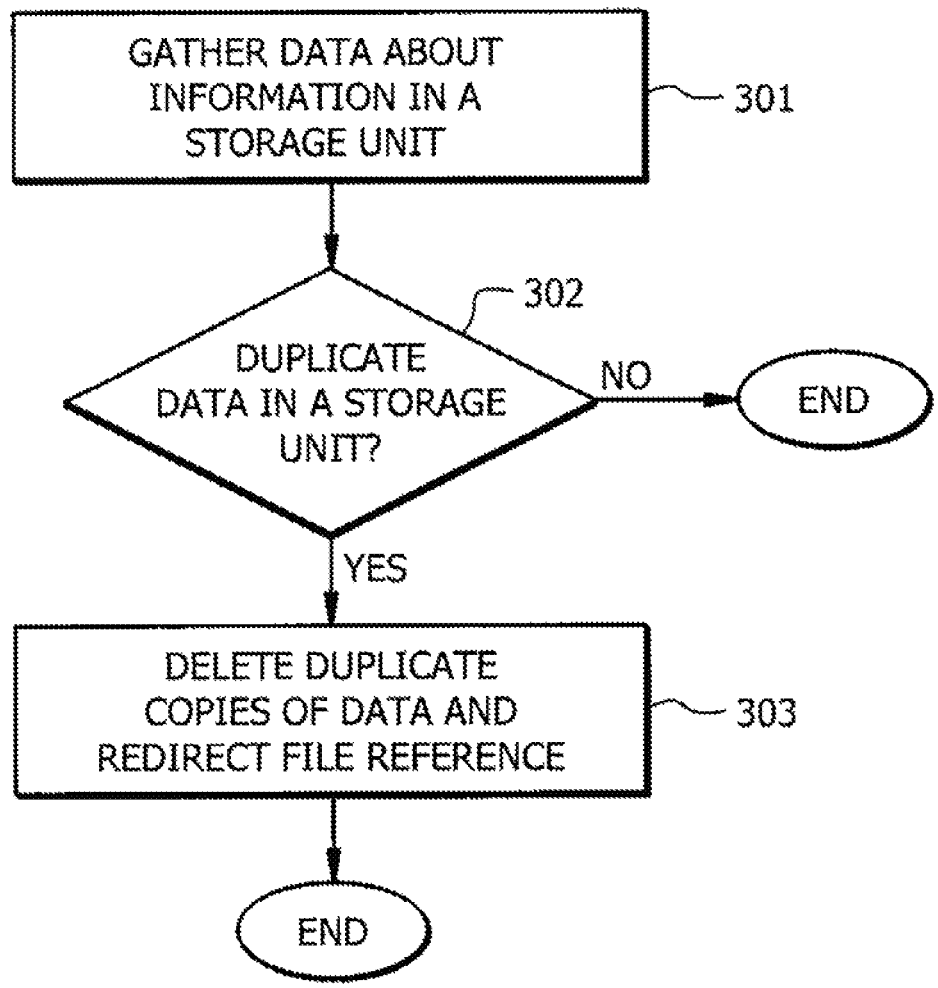
FIG. 3 is a functional block diagram of an example deduplication process described herein.

As briefly described above, scheduler 122 may be operable to perform a deduplication process. FIG. 3 depicts an example of a deduplication process 300 being performed by scheduler 122. Memory, which is accessible by one or more computer processors (for example D-Module 166), is operable to execute a deduplication process performed by scheduler 122. The one or more computer processors performing the deduplication process is operable to access information stored in storage devices 125, wherein the information may be organized into storage volumes, as described above.

In example operations, step 301 of the deduplication process gathers data about the information stored in storage devices 125 to determine whether a storage volume includes therein duplicated data. The gathering process may employ a standard fingerprinting operation that processes through the information stored within a storage volume and uses a hash algorithm to calculate a fingerprint for each data block stored within the storage volume. The fingerprints can be stored within a fingerprint database (not shown). In step 302, scheduler 122 processes the fingerprint database to determine which data blocks, if any, are duplicated within the storage volume. In step 303, the deduplication process can then maintain one copy of a data block and delete the remaining duplicate copies of the data block. In step 303, scheduler 122 may change file references (for example inodes) that refer to the deleted copies of the data block to be redirected to refer to the single maintained copy of the data. In some implementations, the deduplication process may redirect some file references to access data from a common location but may choose to maintain multiple duplicate copies of the data block. As such it will be apparent to those of skill in the art that the actual mechanism employed by the deduplication process for reducing or eliminating duplicate data can vary and any suitable application can be used with the systems and methods described herein.

Not only is scheduler 122 operable to perform deduplication, such as the example process described above, but scheduler 122 is further operable to determine the state of storage volumes and perform operations on respective storage volumes based on the storage volume's determined state. As will be detailed further below, determining the state of a volume and performing operations based, at least in part, on the volume's state aids in the prioritization of volume deduplication processes.

Figure 4:
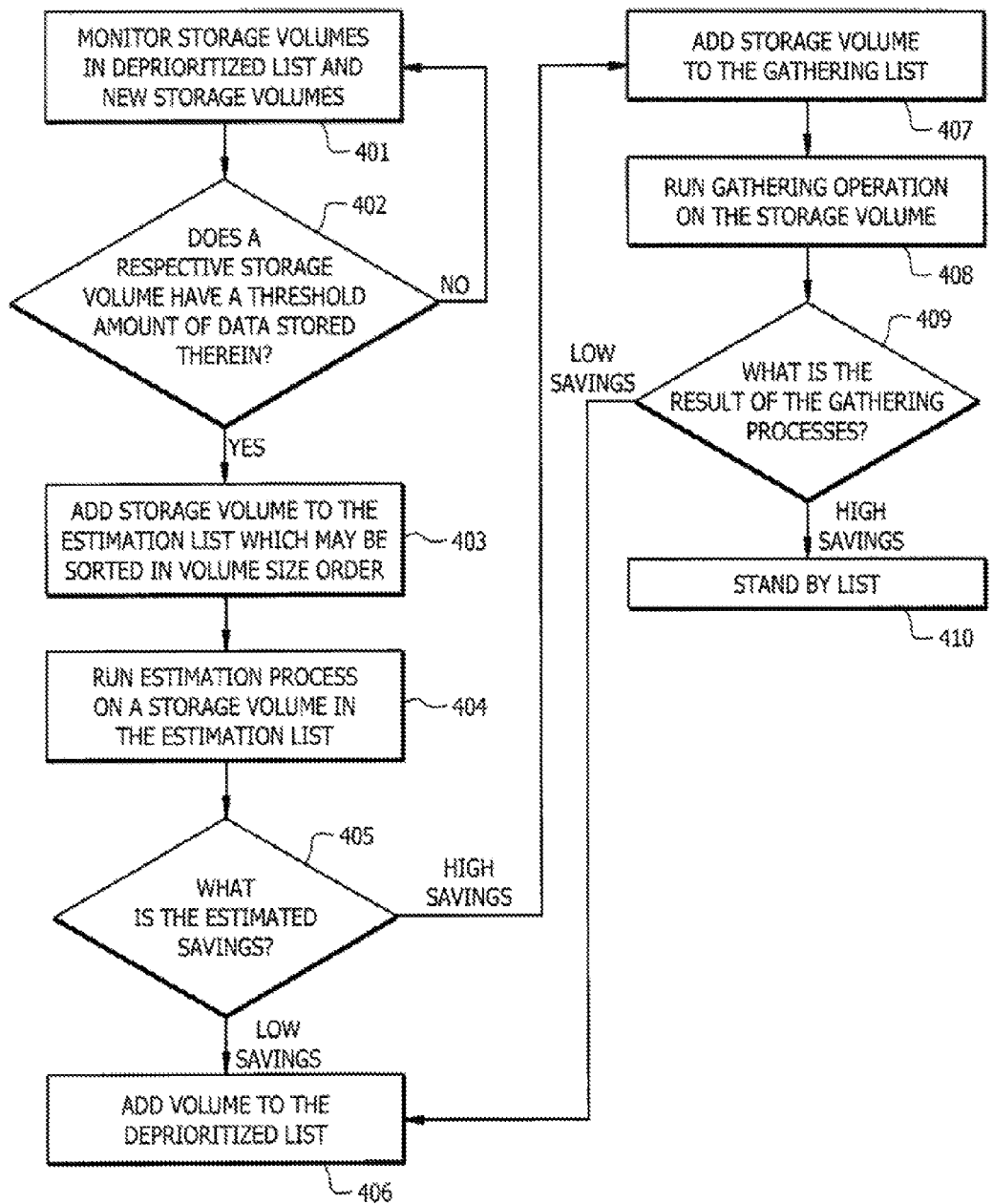
FIG. 4 is a functional block diagram of an example process determining state information about volumes described herein.

FIG. 4 depicts an example of a state-determination process 400 being performed by scheduler 122 to determine the state of respective storage volumes. The example depicted in process 400 determines the state of respective volumes in order to include the respective volume on an estimation list, deprioritized list, and/or a standby list. Memory, which is accessible by one or more computer processors (for example D-Module 166), is operable to execute the volume state determination process 400 performed by scheduler 122. The one or more computer processors performing process 400 is operable to access information stored in storage volumes.

Referring to FIG. 4, in step 401, process 400 monitors new storage volumes and storage volumes which were previously organized into a deprioritized list. In item 402, for a respective storage volume, the process determines whether the respective storage volume stores therein a threshold amount of data. If not, the process goes back to the monitoring step of 401. If the storage volume comprises the threshold amount of data, in item 403, scheduler 122 adds the storage volume to the estimation list. In embodiments, the estimation list may be prioritized. For example, the storage volumes may be stored in the estimation list according to the size of the volume. In item 404, when scheduler determines that processing resources become available (for example, steps 710-713 of FIG. 7 detailed further below), scheduler 122 selects a storage volume from the estimation list and runs an estimation process on the storage volume (for example step 714 of FIG. 7 detailed further below). The estimation process estimates the storage potential savings that a storage volume may realize should the storage volume be deduplicated. For example, the estimation process may determine that amount of disk space that will be freed up by running a deduplication process on the storage volume. By running the estimation process, scheduler 122 is able determine which list the storage volume ought to be moved into, and when the estimation process is run on a respective storage volume, that storage volume is removed from the estimation list and moved into a different list.

In step 405, process 400 determines whether the result of the estimation process indicates that deduplicating the storage volume will result in a low data storage savings or a high data storage savings. The determination may be based on a threshold value. For example, the estimation process may output a value identifying the level of storage savings to be expected, and if the value breaches a threshold level, scheduler 122 may determine that the result indicates either high savings or low savings. In another example, the estimation process may output a percentage or amount of bits expected to be freed up, when the number of bits is compared to a threshold value, scheduler 122 may determine that the result indicates either high savings or low savings.

If the determination of item 405 determines that the savings potential is low savings, then step 406 adds the respective storage volume may be added to the deprioritized list. When a storage volume is placed on the deprioritized list, the storage volume will be monitored by scheduler 122 as shown in item 401.

If the determination of item 405 determines that the savings potential is high savings, then step 407 adds the respective storage volume to the gathering list. In embodiments, the gathering list may be prioritized. For example, the storage volumes may be stored in the gathering list according to the size of the volume. In item 408, when processing resources become available (e.g. see steps 720-722 of FIG. 7 detailed below), scheduler 122 selects a storage volume from the gathering list and runs the gathering operation on the storage volume. The gathering process was described above with reference to FIG. 3. By running the gathering process, scheduler 122 is able to determine which list the storage volume ought to be moved into, and when the gathering process is run on a respective storage volume, that storage volume is removed from the gathering list and moved into a different list.

Item 409 determines whether the result of the gathering process indicates that deduplicating the storage volume will result in a low storage data savings or a high storage data savings. The determination may be based on a threshold value. For example, the gathering process may output a value identifying the level of storage savings to be expected, and if the value breaches a threshold level, scheduler 122 may determine that the result indicates either high savings or low savings. In another example, the gathering process may output the amount of bits expected to be freed up, when the number of bits is compared to a threshold value, scheduler 122 may determine that the result indicates either high savings or low savings.

If the determination of item 409 determines that the savings potential is low savings, step 406 adds the respective storage volume to the deprioritized list. When a storage volume is placed on the deprioritized list, the storage volume will be monitored by scheduler 122 as shown in item 501. If the determination of item 409 determines that the savings potential is high savings, then step 410 will add the storage volume to the standby list (item 410). System implications of a storage volume being added to the standby list will be explained in further detail below with respect to FIGS. 5 and 7.

FIG. 4 depicts an example of a process 400 being performed by scheduler 122 to determine the state of respective storage volumes and, based thereon, organizing the respective volumes in at least one of a deprioritized list, an estimation list, and a standby list. Scheduler 122 may determine additional states of the storage volumes for use in prioritizing operations of the storage volumes. For example, scheduler 122 may determine that a respective storage volumes is in a preferred state and based on that determination, organize the storage volume into a preferred list. In embodiments, scheduler 122 determines that a respective volume is in a preferred state based on the volume being categorized as preferred volumes for example by a system administrator or user. Additionally or alternatively, a storage volume may be categorized as being a preferred storage volume based on scheduler 122's determination of system usage of the storage volume, based on scheduler 122's determination of the importance of the stored volume, based on scheduler 122's determination of the amount of data stored in the stored volume, based on scheduler 122's determination of the location of the stored volume, etc., and any combination thereof. System implications of a storage volume being added to the preferred list will be explained in further detail below with respect to FIGS. 5 and 7.

As explained above, scheduler 122 is operable to execute deduplication requests 501 which perform deduplication processes, and scheduler 122 is further operable to determine the states of storage volumes and organize respective volumes into lists. With the storage volumes organized into lists (e.g. estimation list, deprioritized list, standby list, and preferred list) scheduler 122 is operable to determine whether to generate a deduplication request for a respective volume and prioritize the order in which to execute requests (including requests to perform estimation, requests to perform gathering, requests to perform deduplication, and more). Deduplication requests generated by scheduler 122 are referred to herein as scheduler dedup requests. For example, a scheduler dedup request may identify a particular storage volume that is in the preferred list for deduplication. In another example, a scheduler dedup request may identify a particular storage volume that is in the standby storage volume for deduplication. Scheduler 122 is operable to prioritize a request for deduplication based at least on which list a storage volume is organized into. For example, a scheduler dedup request identifying a storage volume in a preferred list may be prioritized over and executed before a scheduler dedup request identifying a storage volume in a standby list.

Additionally, other requests may originate from scheduler 122, but be requests to perform operations other than deduplicating a storage volume. Examples of such requests are described above for example, a request to perform a volume estimation process, a request to perform a gathering process, and/or other requests involving state determining processes. Requests generated by scheduler 122 are referred to herein as scheduler requests and may include, for example, scheduler dedup requests, gathering requests, estimation requests, and any other request generated by scheduler 122.

Scheduler 122 is also operable to prioritize and execute requests other than scheduler requests. Other deduplication requests may be a deduplication request that originated from sources outside of scheduler 122, for example from a user or from an operation configured by a user. Such requests are referred to herein as user requests and user-auto requests, respectively. A user request may be a request which is a manually entered command and/or one time request to execute a deduplication on one or more storage volumes that are not currently being managed by the scheduler. A user-auto request may be a request which is a manually entered command request to execute a deduplication on one or more storage volumes that are currently being managed by the scheduler. Further, a user-auto request may be created by user configured operations which automatically trigger the system to generate the user-auto request. For example, a user-auto request may be automatically created by the system upon a triggering event. Examples of triggering events include the passage of time, breaching a threshold value of storage capacity, breaching a threshold level of activity and/or inactivity, breaching a threshold value of system usage or non-usage, breaching a threshold level of system speed or lack of speed, and/or any combination thereof. A user configured operation which automatically triggers the system to generate a user-auto request may have been created by a user to manage a volume in accordance with the user's desires.

Requests are scalable in that the scope of a request may not be limited to a single storage volume (or a portion thereof). For example, requests may identify a unit of storage which may be one or more mass storage devices 125, one or more storage server systems 152, one or more client systems 154, one or more cluster network environments 150, or any combination thereof, upon which to perform the request. In order to make the present description easier to understand, example requests provided herein identify one or more volumes (or part thereof), but the disclosure herein is not limited to such embodiments.

Requests may be identified according to class. The classification of a request 501 identifies which entity generated the request. For example, user requests and user-auto requests may be identified as being in a user generated class. In another example, scheduler 122 requests (e.g., a scheduler dedup request or a gathering request) may be identified as being in a scheduler generated class. The system is operable to include other classes as is desired.

Requests may also be identified according to type. The type identification of a request may identify a type of operation the request is requesting be performed. For example, a deduplication request (e.g. a user request or a scheduler dedup request) may be a deduplication type. In another example, a gathering request may be a gathering type. Examples of some types of operations include, but are not limited to, a volume estimation type, process a change log type (detailed below), a request to trigger a revert type, a request to enable or disable deduplication on a given volume type, a request to provide notification when the volume is taken offline and/or when the volume is mounted type, etc. Request types and classifications may be used by scheduler 122 when prioritizing the execution of requests.

Figure 5A:
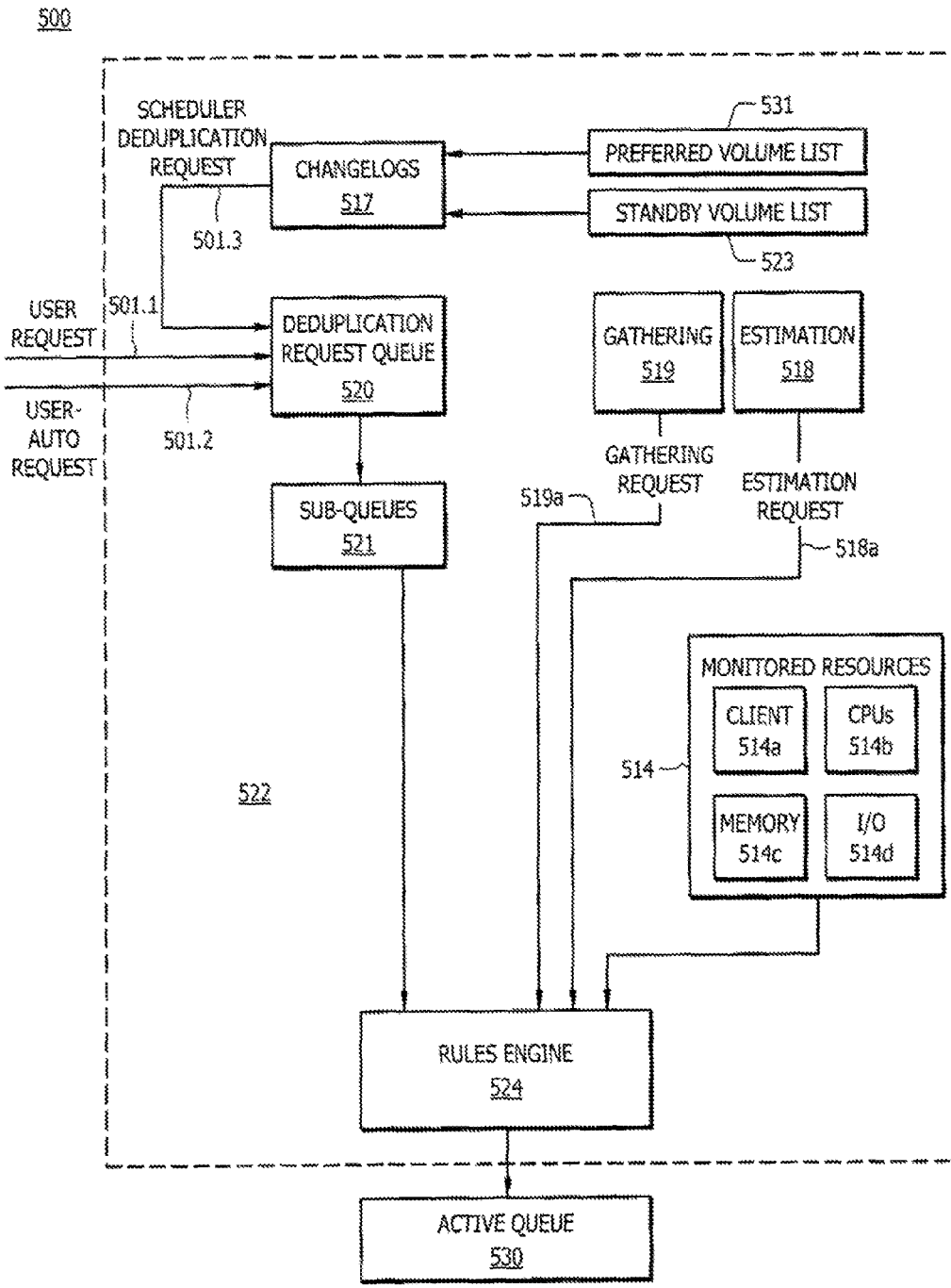
FIGS. 5A and 5B are schematic block diagrams of an example system operable to perform operations described herein.
Figure 5B:
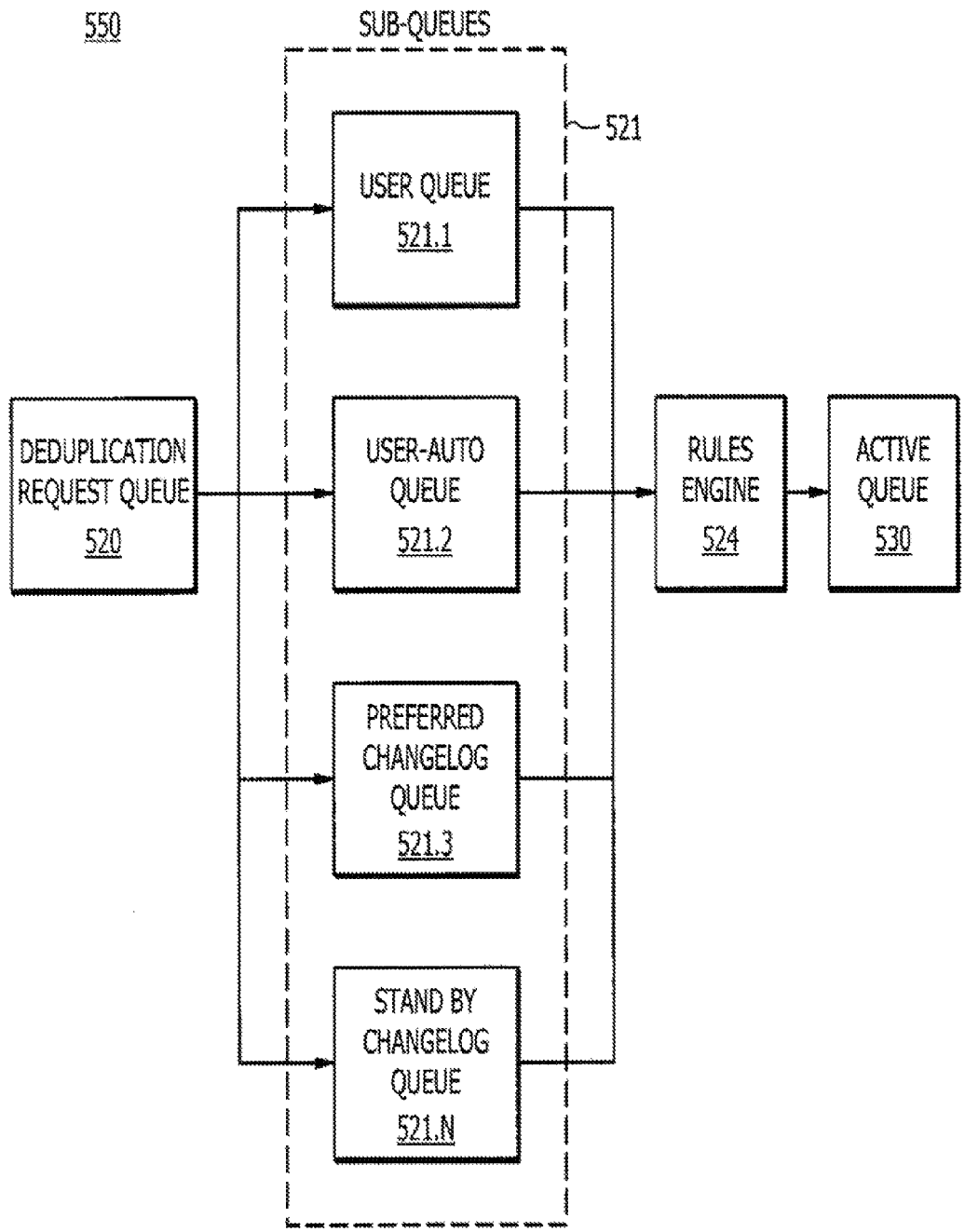

FIGS. 5a and 5b are schematic block diagrams of a system operable to perform operations described herein. Scheduler 522, of FIG. 5a, comprises sub-queues 521 which are described in further detail in FIG. 5b. However, it will be apparent to those of skill in the art, that other queue configurations may be implemented by scheduler 522.

FIG. 5a shows an example system 500 including scheduler 522 in communication with active queue 530. In operation, scheduler 522 may be operable to collect, receive, intercept, and/or generate requests, for example deduplication requests and scheduler requests. Scheduler 522 is operable to identify the type of the request and the classification of the request, and buffer them accordingly. For example, requests of the deduplication type can be buffered in deduplication request queue 520. Examples of requests that are of the deduplication type that are buffered in deduplication request queue 520 are user requests 501.1, user-auto requests 501.2, and scheduler dedup requests 501.3.

Scheduler 522 may generate a scheduler dedup requests 501.3 based on respective volumes' changelogs. A changelog is a log which tracks changes to data stored in respective storage units (e.g. storage volume). For example, when new data is written to a volume, the volume's changelog is updated to indicate that a change was made to the volume. Each storage volume may have a changelog associated thereto. Respective changelogs are stored on memory that is accessible to scheduler 522. FIG. 5a shows changelogs 517 being located within Scheduler 522, but it should be understood that changelogs 517 may be distributively and/or remotely located from scheduler 522 as long as information regarding the changelogs is accessibly by scheduler 522.

When generating a scheduler dedup request 501.3 based on information in changelogs 517, scheduler 522 may first determine whether a volume is listed in preferred volume list 531 and/or standby volume list 523, and decide whether to generate a scheduler dedup request 501.3 based on that determination. Further, when generating a scheduler dedup request 501.3, scheduler 522 may identify within the request, whether the volume is a preferred volume or a standby volume based on whether the volume is organized into the preferred volume list 531 and/or standby volume list 523. Upon generating a scheduler dedup request 501.3, scheduler 522 passes the scheduler dedup request 501.3 to deduplication queue 520.

Deduplication queue 520 may buffer a plurality of scheduler dedup requests 501.3 as well as other deduplication requests, such as user requests 501.1 and user-auto requests 501.2. Deduplication requests 501 in deduplication request queue 520 can be organized into sub-queues 521 by scheduler 522. Rules engine 524 may be involved in organizing deduplication requests 501 into sub-queues 521.

FIG. 5B depicts an example organizational structure of sub-queues 521. In embodiment, scheduler 522 may organize the sub-queues as follows: user request queue 521.1, user-auto queue 521.2, preferred changelog queue 521.3, and standby changelog queue 521.N. Additional sub-queues may be established as desired. With the example sub-queues of FIG. 5B, deduplication requests may be sorted into their respective sub-queue at least according to the class of the request (for example, user generated class, user-auto generated class, or scheduler generated class). In such an example, requests that are classified as being user generated may be sorted into user queue 521.1, user-auto requests 501.2 may be sorted into user-auto queue 521.2, and scheduler dedup requests may be sorted into one of preferred changelog queue 521.3 or standby changelog queue 521.N.

Further, deduplication requests may be further sorted into their respective sub-queue based on the type of request (for example, requests identifying preferred storage volumes or requests identifying standby storage volumes). For example, requests that are classified as scheduler generated requests may use additional factors to determine which sub-queue to sort the scheduler dedup request 501.3 into. For example, a scheduler generated request 501.3 that identifies a preferred volume to be deduplicated may be moved into the preferred changelog queue 520.3 while a scheduler dedup request 501.3 that identifies a standby volume to be deduplicated may be moved into the standby changelog queue 520.N. Organization of deduplication requests into to sub-queues 521 may be used by scheduler 522 to organize deduplication requests according to priority. As such, any number of sub-queues may be established into which various types and classes of requests may be moved into. Further, a hierarchy of sub-queue may be established wherein sub-queue comprise more sub-queues. With an understanding of sub-queues 521, attention should be directed back to FIG. 5a.

As previously explained, scheduler 522 is operable to prioritize and execute a variety of requests, for example user requests 501.1, user-auto requests 501.2, scheduler dedup requests 501.3, and requests to perform state-determination processes (for example gathering requests 519a and estimation requests 518a). In embodiments, scheduler 522 may utilize rules engine 524 in prioritizing and executing the various requests.

When scheduler 522 determines that a request should be executed, scheduler sends the request to active queue 530 for execution. In preparing to send requests to the active queue 530 for execution, scheduler 422 reviews active queue 530 to determine whether any requests are currently active within active queue 530 and, if any are active, scheduler 522 determines how many requests of which type and classification are currently active. The number of requests moved into active queue 530 is at least partially contingent on the determined number of requests that are currently active in active queue 530 as well as the type and classification of the active requests.

A currently active request being executed in active queue 530 can be considered an active operation and/or a session. There may be a limit to the number of sessions that can run concurrently without causing a negative impact on processing capabilities of a system. The number of sessions which can run concurrently without operations being negatively impacted may change from time to time depending on an amount of resources being utilized by each respective session as well as other non-deduplication related operations being executed throughout the system. Scheduler 522 may utilize rules engine 524 to determine the number of concurrent sessions which may optimally run on the system at any given time. Rules engine 524 may take into consideration information from monitored resources 514 when determining the number of optimal number of sessions. For example, rules engine 524 may determine that x number of sessions is the optimum number of sessions for concurrently operation because x number of sessions allows the most sessions to operate in parallel without negatively impacting (or substantially negatively impacting) the system operation. Alternatively, rather than rules engine 524 determining the x number of sessions, scheduler 522 may use a preset x number of sessions, and that preset number may be contingent on various factors, such as the time of day.

Regardless of how the x number of sessions is determined, scheduler 522 will review active queue 530 to determine the number of sessions being executed therein, and based at least partly on that number determine the number of requests to move into active queue 530. For example, if x is the number of sessions that should be executed concurrently, and active queue 530 is currently executing x number of sessions, then scheduler 522 may not move any requests into active queue 530. If, however, schedule 422 determines that x is the number of sessions that should be executed concurrently, and active queue 530 is currently executing y number of sessions (wherein y<x), then schedule 422 will move x-y requests into active queue 530. When requests are moved into active queue 530, the system begins executing the requests (performing the session).

Figure 6:
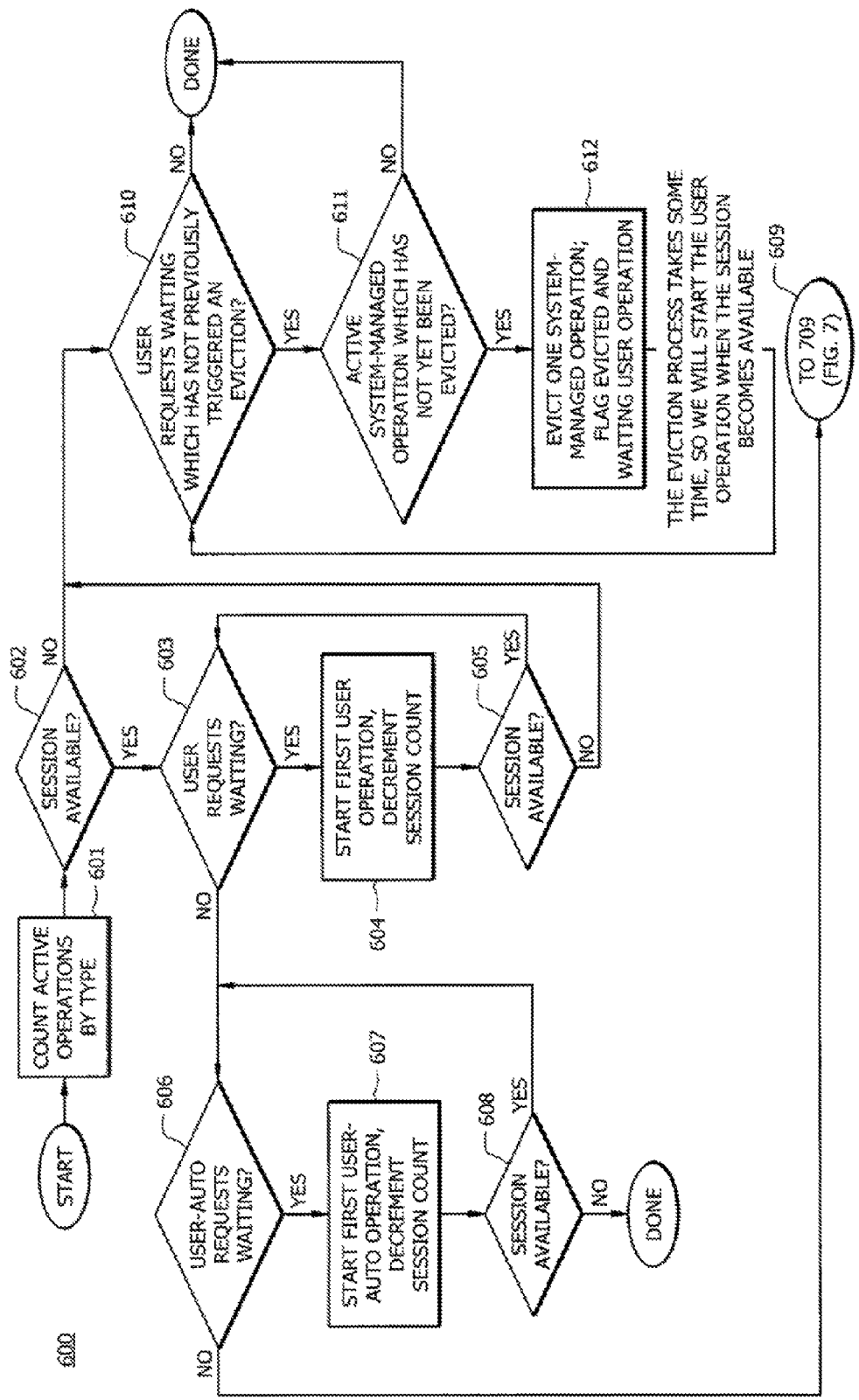
FIGS. 6 and 7 are example flow chart diagrams of a process ordering and executing requests.
Figure 7:
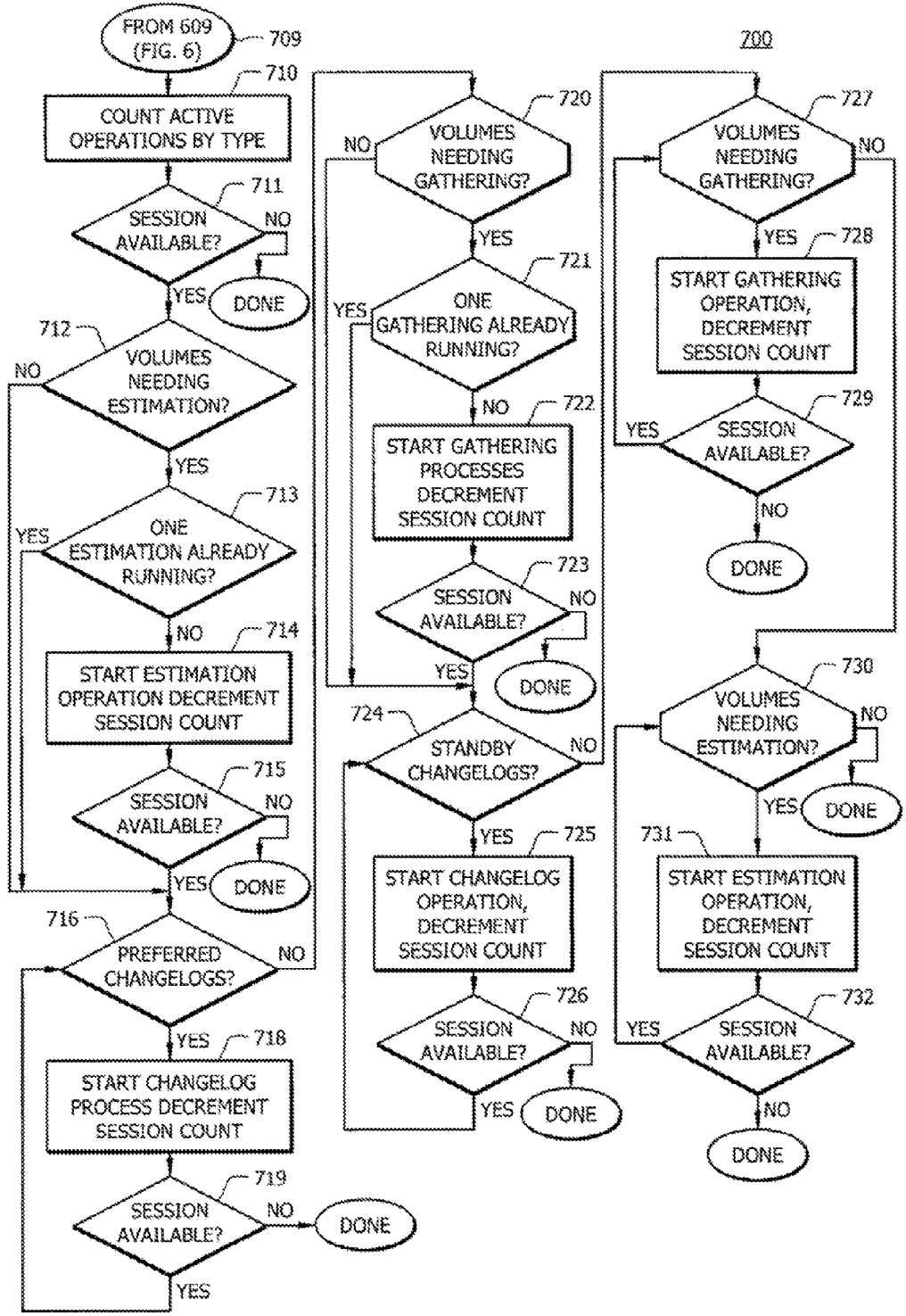

When scheduler 422 determines that there is room in active queue 530 to move one or more request (e.g. x-y requests) into active queue 530, scheduler 422 may select which requests to move to active queue 530 based on priority. An example of selecting requests to move into active queue 530 based on priority is disclosed in FIGS. 6-7. In the example depicted in FIGS. 6-7, requests are prioritized as follows: requests in user queue 521.1 have the highest priority, requests in user-auto queue 521.2 have the second highest priority, a request to start an estimation (if one is not already running) has third highest, requests in the preferred changelog queue 521.3 have the fourth highest priority, a request to start a gathering (if one is not already running) has fifth highest priority, requests in the standby changelog queue 521.N have the sixth highest priority, all other gathering requests have the seventh highest priority, and all other estimation requests have the eight highest priority. A mathematical expression of the example prioritization shown in FIGS. 6-7 is as follows: requests in user queue 521.1>requests in user-auto queue 521.2>a request to start an estimation (if one is not already running)>requests in the preferred changelog queue 521.3>a request to start a gathering (if one is not already running)>requests in the standby changelog queue 521.N>all other gathering requests>and all other estimation requests. In other embodiments, the prioritization may be changed as is desired, further, the prioritizations maybe dynamic in that they are changeable automatically by the system upon the triggering of one or more events.

With above described example priority scheme, FIG. 6 shows an example process 600 of moving user requests 501.1 and user configured automatic requests 501.2 from their respective sub-queues (e.g., user queue 521.1 and user-auto queue 521.2) to active queue 530.

In step 601, scheduler 522 counts the active operations (e.g., sessions) executing in active queue 530 and identifies each active operation, if any, by type and class. In step 602, scheduler 522 determines whether any sessions are available to execute a new request. As explained above, scheduler 522 determines the number of sessions which can optimally be active concurrently and compares that number to the number of sessions that are currently running in active queue. If there is a session available, scheduler 522 moves to step 603 to determine whether any requests are buffered in user queue 521.1. If requests are located in user queue 521.1, then scheduler 522 moves one or more requests from user queue 521.1 to active queue 530. In embodiments, requests are moved into and out of user queue 521.1 using First-In-First-Out (FIFO). In alterative embodiments, rules engine 524 may have moved user requests 501.1 into user queue 521.1 and rearranged the order of user requests 501.1 within user queue 521.1, such that user requests 501.1 are moved out of user queue 521.1 according to the rearranged order. Once user request 501.1 is moved from user queue 521.1 to active queue 530, the user request is executed and the sessions available count is decremented by one. At step 605, scheduler 522 determines whether additional sessions are available.

If additional sessions are not available, scheduler moves to step 610 which begins an eviction process. In embodiments, user requests 501.1 may be defined as having a priority high enough to cause active operations of other requests (e.g. non-user requests) to be evicted such that a waiting user request is executed in its stead. Evicting a request may cause an active request to be stopped or paused. If eviction is enabled for the system, when scheduler 522 determines that no sessions are available at step 605, scheduler 522 moves to step 610 to determine whether a user request is waiting in user queue 521.1 that has not previously triggered an eviction. If the determination at step 610 is no, then the process is done until another session becomes available, at which point, the process starts over at step 601. If step 610 determines that there is a user request waiting in user queue 521.1, which has not yet triggered an eviction, then scheduler 522 moves to step 611 to determine whether there is a scheduler request which is currently active in a session. If there is no scheduler request currently active in a session (for example, all sessions are currently occupied by user requests), then the processes is done until another session becomes available. If however, at step 611, scheduler determines that there is a scheduler request currently active in a session, scheduler 522 moves to step 612 where the system evicts one of scheduler requests, flags the evicted scheduler request as evicted, moves the user request to active queue 530, and waits for the user request to be completed before resuming execution of the evicted scheduler request. The eviction process may take time, so the user request may start after the evicted scheduler request successfully is stopped and flagged thereby making the session available. After step 612, scheduler 522 moves to step 610 to determine whether a user request is waiting which has not previously triggered an eviction process. If the determination of 610 is no, then the process is done until another session becomes available, at which point, the process starts over at step 601. If the determination of 610 is yes, then scheduler 522 repeats steps 611-612.

If at step 605, scheduler 522 had determined that additional sessions were available, scheduler 522 returns to step 603 to determine whether a user request 501.1 is in user queue 521.1. If a request is in user queue 521.1, then steps 604 and 605 are repeated. If at step 603, scheduler 522 determines that no requests are in user queue 521.1, scheduler 422 moves to step 606.

In step 606, scheduler 522 determines whether any requests are buffered in user-auto queue 521.2. If requests are located in user-auto queue 521.2, then scheduler 522 moves as many requests 501 from user-auto queue 521.2 to active queue 530 as is optimal. In step 606, if scheduler 522 determines that a request is waiting in user-auto queue 521.2, the request is moved to active queue 530 and the session count is decremented. In embodiments, requests are moved into and out of user-auto queue 521.2 using FIFO. In alterative embodiments, rules engine 524 may have moved user-auto requests 501.2 in to user-auto queue 521.2 and rearranged the order of user-auto requests 501.2 within user-auto queue 521.2, such that user-auto requests 501.2 are moved out of user-auto queue 521.2 according to the rearranged order. At step 608, scheduler 522 determines whether additional sessions are available. If no sessions are available, then the process is done until a session become available, at which point, the process starts over at step 601. If additional sessions are available, scheduler 522 returns to step 606 to determine whether a user-auto request 501.2 is in user-auto queue 521.2. If a request is in user-auto queue 521.2, then steps 607 and 608 are repeated. If at step 606 scheduler determines that no requests are in user-auto queue 521.2, scheduler 522 moves to step 609 which moves the process to FIG. 7.

FIG. 7 starts at step 709, which coincides to step 609 of FIG. 6. In FIG. 6, scheduler 522 processed the requests in the user queue 421.1 and the requests in the user-auto queue 421.2, which in this example, are prioritized higher than the other request. In FIG. 7, scheduler now processes the other request in priority order.

Step 709 starts process 700. In step 710, scheduler 522 counts the active operations (e.g. sessions) in active queue 530 and identifies the operations' type and classification. In step 711, scheduler 522 determines whether any sessions are available. If no sessions are available, then the process is done until a session becomes available, at which point, the process starts over at step 601. If in step 711, sessions are available, then scheduler 522 moves to step 712 which determines whether there is a pending request for a storage volume estimation (e.g. estimation request 518a). If there is a pending estimation request 518a, then scheduler 522 moves to step 713 wherein scheduler 522 determines whether a storage volume estimation process is already running. If scheduler 522 determines that a storage volume estimation process is not already running for a different storage volume, then scheduler 522 moves to step 714 and wherein the estimation request is moved to active queue 530 which starts the estimation operation according to the request. An example of performing an estimation processes on a storage volume is disclosed above in reference to FIG. 4. Upon moving the estimation request to active queue 530, scheduler decrements the session count and moves to step 715 wherein the scheduler determines whether another session is available. If no sessions are available at step 715, the process is done until another session becomes available, at which point, the process starts over at step 601. If at step 715 a session is available, the process moves to step 716.

Referring back to step 712, if scheduler 522 determines that no estimation requests 518*a* are pending, the process moves to step 716. Referring back to step 713, if scheduler 522 determines that one estimation request is already active in active queue 530, then the process moves to step 716 because in the present example, only one estimation request at a time is given priority over requests in the preferred changelog queue 421.3. Thus, if one estimation request is already executing, the other estimation requests are prioritized lower than requests in the preferred changelog queue.

Figure 8:
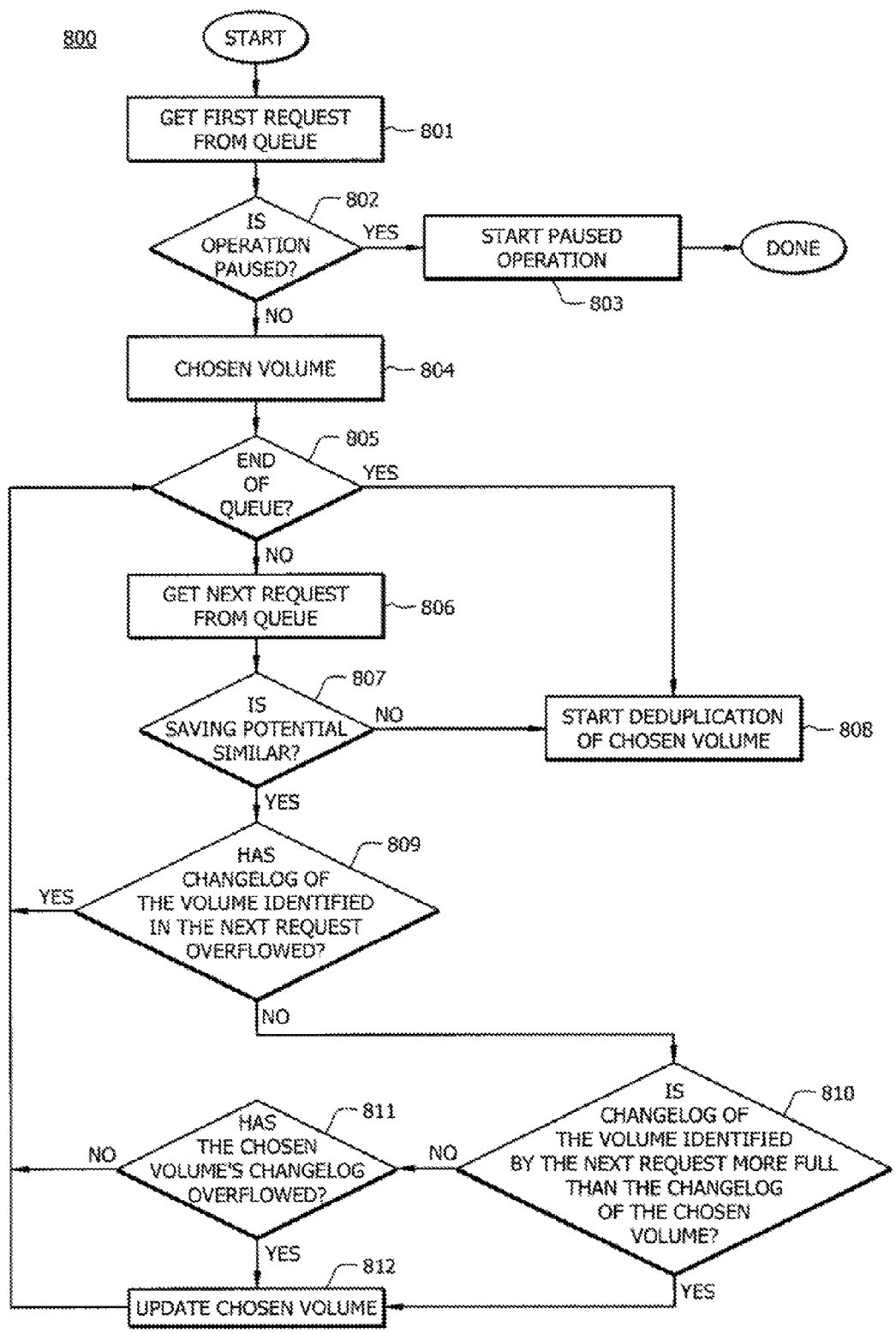
FIG. 8 is an example flow chart diagram of a process determining an order in which to process one or more volumes in a change log queue.

At step 716, scheduler 522 determines whether any requests are waiting in the preferred changelog queue 421.3. If scheduler 522 determines that there is a request in the preferred changelog queue 421.3, at step 718 scheduler 522 moves the request from the preferred changelog queue 421.3 to the active queue 530 which starts the changelog process (detailed below with reference to FIG. 8). In general, the changelog process selects a volume from the preferred volume list 531 and runs a deduplication process on the selected preferred volume. Upon staring the changelog process on the chosen preferred volume, scheduler 522 decrements the session count. In step 719, scheduler 522 determines whether any additional sessions are available. If not, then the process is done until another session becomes available, at which point, the process starts over at step 601. If scheduler 522 determines that another session is available, then scheduler 522 moves back to step 716.

At step 716, scheduler 522 determines whether any requests are waiting in the preferred changelog queue 421.3. If scheduler 522 determines that there is a request in the preferred changelog queue 421.3, then scheduler repeats steps 718-719. If scheduler 522 determines that there is not a request in the preferred changelog queue 421.3, then scheduler 522 moves to step 720.

In step 720, scheduler 522 determines whether there is a pending gathering request 519*a*. If scheduler 522 determines that there is a pending gathering request 519*a*, then scheduler 522 moves to step 721 to determine whether a gathering request is already active in active queue 530. If no gathering request is currently occupying a session in active queue 530, then schedule 522 moves to step 722 and starts a gathering operation by moving the gathering request 519*a* to active queue 530. An example of execution of a gathering request is described above with reference to FIG. 4. Upon starting the gathering operation, scheduler 522 decrements the session count. At step 723, scheduler 522 determines whether there are available sessions. If not, then the process is done until another session becomes available, at which point, the process starts over at step 601. If there are sessions available, scheduler 522 moves to step 724.

Referring back to step 720, if scheduler 522 determines that there are no pending gathering request, the process proceeds to step 724. Also, referring back to step 721, if scheduler 522 determines that a gathering request is already running, then the process moves to step 724 because in the present example, only one gathering request at a time is given priority over requests in the standby changelog queue 421.N. Thus, if one gathering request is already executing, the other gathering requests are prioritized lower than requests in the standby changelog queue 421.N.

At step 724, scheduler 522 begins processing requests that may be in the standby changelog queue 521.N. In step 724, scheduler 522 determines whether there are any requests waiting in the standby changelog queue 521.N. If scheduler 522 determines that there is a request in the standby changelog queue 521.N, then in step 725 scheduler 522 moves the request from the standby changelog queue 521.N to the active queue 530 which starts the changelog process (detailed below with reference to FIG. 8). In general, the changelog process selects a standby volume from standby volume list 523 and runs a deduplication process on the chosen standby volume. Upon starting the operation, scheduler 522 decrements the session count. In step 726, scheduler 522 determines whether any additional sessions are available. If not, then the process is done until another session becomes available, at which point, the process starts over at step 601. If scheduler 522 determines that another session is available, then scheduler 522 moves back to step 724. In step 724, scheduler 522 determines whether there are any requests waiting in the standby changelog queue 521.N. If in step 724 scheduler determines that there are requests in the standby changelog queue 521.N, then scheduler 522 repeats steps 725-726. If in step 724 scheduler determines that there are no requests in the standby changelog queue 521.N, scheduler 522 moves to step 727.

In step 727, scheduler 522 determines whether there are any pending gathering requests 519*a* that are not yet in the active queue 530. If scheduler 522 determines that there are pending gathering request 519*a* that have not yet been executed, scheduler 522 starts a gathering request operation by moving a gathering request to active queue 530. An example of a gathering operation is described above with reference to FIG. 4. Upon starting the gathering request 519*a*, scheduler 522 decrements the session count. At step 729, scheduler 522 determines whether a session is available. If not, then the process is done until another session becomes available, at which point, the process starts over at step 601. If scheduler 522 determines that another session is available, then scheduler 522 moves back to step 727. In step 727, scheduler 522 determines whether there are any pending gathering requests that are not yet in the active queue 530. If in step 272 scheduler 522 determines that there are pending gathering request that have not yet been executed, scheduler 522 executes steps 728-729 again. If in step 272 scheduler 522 determines that there are no pending gathering request, scheduler 522 moves to step 730.

In step 730, scheduler 522 determines whether there are any pending estimation requests 518*a* which have not yet been executed by active queue 530. If not, then the process is done until another session becomes available, at which point, the process starts over at step 601. If in step 730 scheduler 522 determines that an estimation request 518*a* which has not yet been executed by active queue 530 is pending, then scheduler 522 starts an estimation operation by moving an estimation request 518*a* to the active queue 530. An example of an estimation request is detailed above with reference to FIG. 4. Upon moving an estimation request 518*a* to active queue 530, scheduler decrements the session count. In step 732, scheduler 522 determines whether there are any available sessions. If not, then the process is done until another session becomes available, at which point, the process starts over at step 601. If scheduler 522 determines that another session is available, then scheduler 522 moves back to step 730.

In step 730, scheduler 522 determines whether there are any pending estimation requests 518a which have not yet been executed by active queue 530. If not, then the process is done until another session becomes available, at which point, the process starts over at step 601. If in step 730 scheduler 522 determines that an estimation request 518a, which have not yet been executed by active queue 530, is pending, then scheduler 522 repeats steps 731-732.

In short, FIG. 7 shows a process (contingent on a session be available) that prioritizes and executes pending scheduler requests by, for example, starting one estimation request 518a, then cycling through all the requests in the preferred changelog queue 521.3, then starting one gathering request 519a, then cycling through all the requests in the standby changelog queue 521.N, then cycling through all the remaining gathering requests 519a, then cycling through all the remaining estimation requests 518a. The above prioritization order is but one priority order scheme that can be used to prioritize the requests. The prioritization scheme may be changed, as desired, manually through administrative input, automatically (according to triggers or thresholds), or any combination thereof.

In step 718, scheduler 522 starts a changelog process that selects a volume from preferred volume list 531 and runs a deduplication process on the chosen volume. Further, in step 722, scheduler 522 starts a changelog process that selects a volume from standby volume list 523 and runs a deduplication process on the chosen volume. An example of selecting a volume from a volume list (e.g. preferred volume list 531 or preferred volume list 523) and executing a changelog process on the chosen volume is disclosed in FIG. 8.

In short, process 800 executes a prioritization process that aids in choosing a volume, then once the volume is chosen, performs a deduplication process on the chosen volume. This example process 800 compares volumes which are identified in separate scheduler 522 requests and prioritizes the volumes against each other, then deduplicates the volume which is of highest priority as compared to the others. Factors used in prioritizing the volumes include whether the volumes have similar savings potential, the fill level of the volume's changelog, and whether the volumes' changelogs are overflowed.

Example, process 800 starts at step 801 wherein scheduler 522 retrieves the first scheduler dedup requests 501.3 from the queue. For example, the queue may be preferred changelog queue 521.3 or standby changelog queue 521.N. For the sake of brevity, process 800 will be described with respect to preferred changelog queue 521.3, but the process is also functional to operate on standby changelog queue 521.N. In step 802, scheduler 522 determines whether the scheduler dedup request 501.3 retrieved from the preferred changelog queue 521.3 is a paused operation (e.g. due to an eviction as described in FIG. 6). If the retrieved scheduler dedup requests 501.3 is a paused operation, then scheduler 522 moves to step 803 which restarts (e.g. resumes) the paused operation by moving the scheduler dedup requests 501.3 back to active queue 530. Upon completing step 803, process 800 is done at which point scheduler 520 returns to step 719 (or 726) of FIG. 7.

If the retrieved request is not a paused operation, then scheduler 522 moves to step 804 where scheduler sets the volume identified in the retrieved request as being the chosen volume. In step 805, scheduler 522 determines whether the end of the queue has been reached. In other words, scheduler 522 determines whether any additional scheduler dedup requests 501.3 are located in the preferred changelog queue 521.3. If the end of the queue has been reached (e.g. there are no more scheduler dedup requests 501.3), then scheduler 522 starts the deduplication process on the volume set as the chosen volume at step 808. If in step 805, scheduler 522 determines that the end of the queue has not been reached, then scheduler moves to step 806 where scheduler 522 goes to the next scheduler dedup requests 501.3 in the queue. In step 807, scheduler 522 compares the savings potential that may be realized from deduplicating the volume set as the chosen volume to the savings potential that may be realized from deduplicating the volume identified in the next scheduler dedup requests 501.3 and determines whether the savings potential is similar.

Whether a savings potential is similar may be based on a percentage value or a threshold value wherein a value is within a predetermined range to be considered similar and outside a predetermined range to be considered not similar. The range may by a sliding scale that takes into account other factors such as system resources and the like. Other methods of determining whether the savings potential is similar may be used. In step 807, if scheduler 522 determines that the savings potential is not similar, then in step 808 scheduler 522 starts deduplication of the volume set as the chosen volume. If in step 807, scheduler 522 determines that the savings potential is similar, then scheduler 522 moves to step 809.

In step 809, scheduler 522 determines whether the changelog of the volume identified in the next scheduler dedup requests 501.3 has overflowed. Changelogs may be set to hold a threshold amount of data or a threshold number of entries that log changes to the data stored in its associated volume. If that threshold number is exceed, the changelog may be considered overflowed. If a changelog has overflowed, it may take more time and more system resources to perform a deduplication process on the volume as compared to a volume having a changelog that has not overflowed because when a changelog has overflowed, further changes may not be logged and further duplications may not be detected, resulting in less savings. The lost savings may be recovered at a significant cost by running a gathering operation, but due to the gathering operation, it may take more time and more system resources to perform a deduplication process on a volume with an overflowed changelog as compared to a volume with a changelog that has not overflowed.

As such, in some embodiments, it may be desirable to deduplicate volumes that do not have an overflowed changelog before deduplicating volume which has an overflowed changelog. If this is the case, then volumes that do not have an overflowed changelog may be prioritized such that they are deduplicated before volumes with an overflowed changelog. In step 809 of example process 800, scheduler 522 determines whether there is an overflow in the changelog of the volume identified in the next request.

If in step 809, scheduler 522 determines that there is an overflow in the changelog of the volume identified in the next request, as a result of the overflowed changelog, scheduler 522 does not choose the volume identified in the next request, moves to step 805, and repeats steps 805-809 until the process reaches the end of the queue, meaning that a volume has been chosen. In step 808, process 800 starts the deduplication process on the chosen volume.

If in step 809, scheduler 522 determines that there is not an overflow in the changelog of the volume identified in the next request, scheduler 522 moves to step 810 wherein scheduler 522 determines whether the changelog of the volume identified by the next request is fuller than the changelog of the volume identified by the chosen request. As a changelog becomes filled with more changes, it grows closer to overflowing. As such, in embodiments, it may be desirable to deduplicate a volume with a changelog that is fuller as compared to a volume with a changelog that is less full in an effort to prevent or reduce changelog overflows. If this is the case, then a volume having a changelog that is more full than another may be prioritized such that the volume with the more full changelog is deduplicate before the volume with the less filled changelog. In step 810, example process 800 scheduler 522 determines whether the changelog of the volume identified by the next request is fuller than the changelog of the chosen volume. If step 810 determines that the changelog of the volume identified by the next request is more filled, then in step 812, scheduler 522 updates the chosen volume such that it identifies the volume from the next request. Changing the chosen volume as disclosed in step 812 reprioritizes the next request's identified volume over the previous request's identified volume.

If step 810 determines that the changelog of the chosen volume is fuller, then scheduler moves to step 811. In step 811, scheduler 522 determines whether the changelog of the chosen volume has overflowed. If the changelog of the chosen volume has overflowed, then scheduler 522 moves to step 812 where scheduler 522 updates the chosen volume such that it identifies the volume that was identified in the next request. From step 812, scheduler 522 moves to step 805 and repeats steps 805-809 until the process reaches the end of the queue, meaning that a volume has been chosen. With a volume chosen, process 800 moves to step 808 and starts the deduplication process on the chosen volume.

Referring back to step 811, scheduler 522 determines whether the changelog of the chosen volume has overflowed. If the changelog of the chosen volume has not overflowed, then from step 811, scheduler 522 moves to step 805 and repeats steps 805-809 until the process reaches the end of the queue, meaning that a volume has been chosen, and process 800 moves to step 808 and starts the deduplication process on the chosen volume.

As explained, process 800 is, in short, a process that executes a prioritization process to choose a volume and once the volume is chosen, performs a deduplication process on the chosen volume. The example process compares volumes which are identified in scheduler requests, prioritizes the volumes against each other, and deduplicates the volume which is of highest priority. Factors used in prioritizing the volumes include whether the volumes have similar savings potential, the fullness level of the volumes' changelogs, and whether the volumes' changelogs are overflowed.

The software modules, software layers, or threads described herein may comprise firmware, software, hardware or any combination thereof and is configured to perform the processes described herein. For example, the storage operating system may comprise a storage operating system engine comprising firmware or software and hardware configured to perform embodiments described herein. As a further example, the hash processor 304 may have an engine which includes firmware or software and hardware configured to perform as described herein.

The storage devices 125 and 232 may comprise disk devices that are arranged into a plurality of volumes, each having an associated file system. In some embodiments, the storage devices 125 or 232 comprise disk devices that are configured into a plurality of RAID (redundant array of independent disks) groups whereby multiple storage devices 125 or 232 are combined into a single logical unit (i.e., RAID group). In a typical RAID group, storage devices 125 or 232 of the group share or replicate data among the disks which may increase data reliability or performance. The storage devices 125 or 232 of a RAID group are configured so that some disks store striped data and at least one disk stores separate parity for the data, in accordance with a preferred RAID-4 configuration. However, other configurations, for example RAID-5 having distributed parity across stripes, RAID-DP, etc., are also contemplated. A single volume typically comprises a plurality of storage devices 125 or 232 and may be embodied as a plurality of RAID groups.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   determining storage unit priority for each of a plurality of storage units that have at least a threshold data amount, wherein the determination of priority is based, at least in part, on a threshold deduplication savings estimate;
   maintaining a first queue of deduplication requests having a first scheduling priority;
   maintaining a second queue of deduplication requests having a second scheduling priority that is below the first scheduling priority, wherein deduplication requests in the second queue were generated for storage units determined to have a first storage unit priority and for which a changelog event was detected;
   in response to a determination that resources are available, select deduplication requests from the first queue for execution; and
   in response to a determination that resources are available and that no requests are pending in the first queue, select for execution from the second queue based, at least in part, on potential deduplication savings of indicated storage units and changelogs of indicated storage units.

2. The method of claim 1 further comprising estimating deduplication savings for each of the plurality of storage units in response to a determination that each of the plurality of storage units has at least the threshold data amount.

3. The method of claim 1, wherein determining storage unit priority comprises determining that a storage unit has a first storage unit priority if the deduplication savings estimate for the storage unit satisfies the threshold deduplication savings estimate and determining that a storage unit will continue to be monitored if the deduplication savings estimate for the storage unit does not satisfy the threshold deduplication savings estimate.

4. The method of claim 3, further comprising monitoring newly detected storage units and storage units that do not satisfy the threshold deduplication savings estimate, wherein monitoring comprises periodically determining whether the storage units have the threshold data amount.

5. The method of claim 1, wherein maintaining the first queue of deduplication requests comprises enqueuing a deduplication request into the first queue if generated from a user related trigger.

6. The method of claim 1, further comprising maintaining a third queue of deduplication requests having a third scheduling priority junior to the second scheduling priority, wherein deduplication requests in the second queue were generated for storage units determined to have a second storage unit priority and for which a changelog event was detected.

7. The method of claim 1, further comprising:
maintaining a third queue for requests to estimate deduplication savings for storage units determined to have at least the threshold data amount, wherein the third queue has a third scheduling priority that is greater than the second scheduling priority but less than the first scheduling priority; and
maintaining a fourth queue for requests to determine storage units that have at least the threshold data amount, wherein the fourth queue has a fourth scheduling priority that is greater than the second scheduling priority but less than the third scheduling priority.

8. The method of claim 1, wherein selecting for execution from the second queue comprises selecting a deduplication request from the second queue with a fullest changelog that is not overflowed and based, at least in part, on a calculated potential deduplication savings.

9. One or more non-transitory machine-readable media comprising program code for priority based deduplication scheduling, the program code to:
determine storage unit priority for each of a plurality of storage units that have at least a threshold data amount, wherein the determination of priority is based, at least in part, on a threshold deduplication savings estimate;
based on generation of a deduplication request, determine a scheduling priority for the deduplication request based, at least in part, on a trigger for the deduplication request, wherein a deduplication request with a changelog based trigger has a lower scheduling priority than a user related trigger and scheduling priority of a deduplication request with a changelog based trigger is also based, at least in part, on storage unit priority of a storage unit indicated in the deduplication request; and
in response to a determination of resource availability, select requests in accordance with scheduling priority.

10. The non-transitory machine-readable media of claim 9 further comprising program code to estimate deduplication savings for each of the plurality of storage units determined to have at least the threshold data amount.

11. The non-transitory machine-readable media of claim 10, wherein the program code to determine storage unit priority comprises program code to determine that a storage unit has a first storage unit priority if the deduplication savings estimate for the storage unit satisfies the threshold deduplication savings estimate and to determine that a storage unit will continue to be monitored if the deduplication savings estimate for the storage unit does not satisfy the threshold deduplication savings estimate.

12. The non-transitory machine-readable media of claim 11 further comprising program code to monitor newly detected storage units and storage units that do not satisfy the threshold deduplication savings estimate, wherein the program code to monitor comprises program code to periodically determine whether the storage units have the threshold data amount.

13. The non-transitory machine-readable media of claim 9, wherein the program code to determine the scheduling priority for the deduplication request comprises program code to determine whether the deduplication request was triggered by a changelog event, the deduplication request is a manually triggered deduplication request, or whether the deduplication request was automatically triggered by a user configured schedule or a user configured threshold.

14. The non-transitory machine-readable media of claim 9, wherein the program code to select requests in accordance with scheduling priority comprises program code to:
first select for execution deduplication requests with user related triggers;
second select for execution a request to estimate deduplication savings for each of the plurality of storage units determined to have at least the threshold data amount;
third select for execution deduplication requests with changelog based triggers and that indicate storage units with a first storage unit priority;
fourth select for execution a request to determine which storage units have at least the threshold data amount; and
fifth select for execution deduplication requests with changelog based triggers and that indicate storage units with a second storage unit priority.

15. The non-transitory machine-readable media of claim 9 further comprising program code to:
based on determination of resource availability and determination that a set of deduplication requests with changelog based triggers can be selected for execution in accordance with scheduling priority, select for execution a deduplication request from the set of deduplication requests that does not have an overflowed changelog, has a most full changelog, and based, at least in part, on a calculated potential deduplication savings.

16. An apparatus comprising:
a processor; and
a machine-readable medium having instructions stored thereon that are executable by the processor to cause the apparatus to,
determine storage unit priority for each of a plurality of storage units that have at least a threshold data amount, wherein the determination of priority is based, at least in part, on a threshold deduplication savings estimate;
based on generation of a deduplication request, determine a scheduling priority for the deduplication request based, at least in part, on a trigger for the deduplication request, wherein a deduplication request with a changelog based trigger has a lower scheduling priority than a user related trigger and scheduling priority of a deduplication request with a changelog based trigger is also based, at least in part, on storage unit priority of a storage unit indicated in the deduplication request; and
in response to a determination of resource availability, select requests in accordance with scheduling priority.

17. The apparatus of claim 16, wherein the machine-readable medium further has stored thereon instructions executable by the processor to cause the apparatus to monitor newly detected storage units and storage units that do not satisfy the threshold deduplication savings estimate, wherein the instructions to monitor comprise instructions to periodically determine whether the storage units have the threshold data amount.

18. The apparatus of claim 16, wherein the instructions to determine the scheduling priority for the deduplication request comprises instructions executable by the processor to cause the apparatus to determine whether the deduplication request was triggered by a changelog event, the deduplication request is a manually triggered deduplication request, or whether the deduplication request was automatically triggered by a user configured schedule or a user configured threshold.

19. The apparatus of claim 16, wherein the instructions to select requests in accordance with scheduling priority comprises instructions executable by the processor to cause the apparatus to:
  first select for execution deduplication requests with user related triggers;
  second select for execution a request to estimate deduplication savings for each of the plurality of storage units determined to have at least the threshold data amount;
  third select for execution deduplication requests with changelog based triggers and that indicate storage units with a first storage unit priority;
  fourth select for execution a request to determine which storage units have at least the threshold data amount; and
  fifth select for execution deduplication requests with changelog based triggers and that indicate storage units with a second storage unit priority.

20. The apparatus of claim 16, wherein the machine-readable medium further has stored thereon instructions executable by the processor to cause the apparatus to, based on determination of resource availability and determination that a set of deduplication requests with changelog based triggers can be selected for execution in accordance with scheduling priority, select for execution a deduplication request from the set of deduplication requests that does not have an overflowed changelog, has a most full changelog, and based, at least in part, on a calculated potential deduplication savings.

* * * * *